3,003,850
PREPARATION OF MONONITRATODIOXO-VANADIUM(V)

Edward A. Heintz, Williamsville, and Albert K. Fischer, Buffalo, N.Y., assignors to Union Carbide Corporation, a corporation of New York
No Drawing. Filed Dec. 21, 1959, Ser. No. 860,638
3 Claims. (Cl. 23—140)

This invention relates to the preparation of a vanadium compound having the formula $VO_2NO_3$ and designated as mononitratodioxovanadium(V).

It is an object of this invention to provide a novel compound of vanadium, namely, mononitratodioxovanadium(V), $VO_2NO_3$.

Another object of this invention is to provide a method of preparing mononitratodioxovanadium(V).

A further object of this invention is to provide a novel method of producing high-purity vanadium pentoxide.

Other objects and advantages of the invention will be apparent from the following description and appended claims.

The novel compound, mononitratodiodovanadium(V), $VO_2NO_3$, is prepared by a process which comprises reacting elemental vanadium with liquid dinitrogen tetroxide in the presence of a suitable catalyst.

The novel process for the production of mononitratodioxovanadium(V), $VO_2NO_3$, comprises reacting vanadium metal and liquid dinitrogen tetroxide in the presence of catalytic amounts of acetonitrile, $CH_3CN$, in an inert atmosphere at about atmospheric pressure at a temperature of about 0 to about 5° C.

The above process corresponds to the equation:

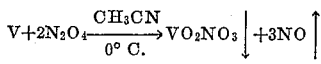

and may be conveniently practiced by introducing liquid dinitrogen tetroxide into a reaction vessel which has an inlet suitable for this purpose, a second inlet for the introduction of a suitable catalyst such as acetonitrile, and an outlet in which is inserted a "cold finger" condenser of a type similar to that illustrated at page 64 of "Experiments in Organic Chemistry" by L. F. Feiser, second edition (1941), (published by Heath and Company, Boston). A mixture of Dry Ice and acetone may be provided in the cold finger of the condenser and, while the reaction is progressing, the outlet of the condenser is vented to atmospheric pressure in a hood. During the reaction the condenser serves as a refluxer to return unreacted solvent to the system and, upon completion of the reaction, the outlet of the condenser may be connected to a vacuum pump system for the removal of unreacted substances from the reaction vessel. In view of the highly hygroscopic nature of the product, mononitratodioxovanadium(V), $VO_2NO_3$, it is desirable to purge the reaction vessel with an inert and non-reactive gas such as argon, prior to the admission of the dinitrogen tetroxide and catalyst. The reaction is carried out at temperatures ranging from about 0 to about 5° C. and at about atmospheric pressure.

The compound produced by this process, mononitratodioxovanadium(V), is precipitated as a brick-red product and is a very powerful hygroscopic material.

The novel composition, mononitratodioxovanadium(V), $VO_2NO_3$, is very soluble in water and produces therein an orange-colored solution which, when minimum concentration of mononitratodioxovanadium(V), is approximately 0.73 gram per 100 milliliters of water, forms a deep brown gel within 24 hours.

In addition, rapid decomposition of the mononitratodioxovanadium(V) takes place upon simple heating to approximately 350° C. according to the equation:

$$2VO_2NO_3 \rightarrow V_2O_5 + N_2O_5\uparrow$$

with the formation of high purity vanadium pentoxide. The compound thus formed is of value in the production of high quality vanadium. The heating, however, should take place in vacuo or in an inert environment, in view of the high degree of hygroscopicity of the mononitratodioxovanadium(V).

Additional characteristic properties of the novel compound are set forth in the following table:

TABLE

| | |
|---|---|
| Formula | $VO_2NO_3$. |
| Infrared absorption maxima | 7.25μ (v.s.), 12.19μ (v.w.), 9.9μ (s.). |
| Specific gravity | 2.055 at 25° C. |
| Crystal structure | Amorphous. |
| Indices of refraction | One (isotropic, >1.78). |
| Molecular weight | 144.96. |
| Magnetic moment | 0.08 Bohr magneton. |

The following example will provide a better understanding of the process employed in the preparation of mononitratodioxovanadium(V).

Example I

Five grams of pea-sized electrolytic vanadium chips were placed in a laboratory Pyrex flask of the three-necked type. One of the lateral connections served as an inlet for argon and dinitrogen tetroxide whose anhydrous conditions were ensured by means of a $CaCl_2$ tube; the other lateral connection was fitted with a separatory funnel through which acetonitrile catalyst was added. The center connection was fitted with a "cold finger" condenser of a type disclosed hereinabove, the outlet of which was vented to atmospheric pressure during the reaction. The cold finger of the condenser contained a mixture of Dry Ice and acetone and the condenser served as a refluxer to return unreacted solvent to the system. After the vanadium chips were introduced into the flask, the entire system was purged with dry argon gas for about 40 minutes.

The flask was then placed in an ice bath so that the temperature was maintained at from 0 to about 5° C. during the reaction. Dinitrogen tetroxide was then introduced into the flask and allowed to liquefy until approximately 75 to 100 ml. of brownish liquid were present in the flask. Subsequently, about 5 to 8 ml. of acetonitrile were added to the mixture, and a brick-red powder $(VO_2NO_3)$ was seen to precipitate. The reaction mixture was allowed to stand at 0 to 5° C. for about 5 to 6 additional hours, at which time the excess solvent and catalyst were removed by connecting the outlet of the condenser to a vacuum pump system. The brick-red product was analyzed and found to be mononitratodioxovanadium(V) $(VO_2NO_3)$. The yield was approximately 91% based on the amount of vanadium employed in the process.

A further example is provided to illustrate the novel method of producing high purity vanadium pentoxide described hereinabove.

Example II

Three grams of mononitratodioxovanadium(V) were placed in a porcelain boat and heated in a Pyrex tube under an argon stream at 350° C. for six hours. 1.89 grams of a solid residue were obtained, the analysis of which showed it to be 100% $V_2O_5$. Thus the thermal decomposition was quantitative. The $N_2O_5$ effluent gas was trapped in $H_2O$ as it left the reaction zone and gave a positive test of presence for the $HNO_3$.

What is claimed is:
1. As a novel composition of matter, a novel compound of vanadium, mononitratodioxovanadium(V), having the formula $VO_2NO_3$.
2. The method of producing mononitratodioxovanadium(V) which comprises reacting vanadium metal and dinitrogen tetroxide in the presence of catalytic amounts of acetonitrile in an inert atmosphere at about atmospheric pressure at a temperature of about 0 to about 5° C.
3. The method of producing high purity vanadium pentoxide which comprises heating mononitratodioxovanadium(V) in an inert environment to approximately 350° C. whereby high purity vanadium pentoxide is formed according to the equation:

$$2VO_2NO_3 \rightarrow V_2O_5 + N_2O_5 \text{ (g.)}$$

References Cited in the file of this patent

Mellor: "Comprehensive Treatise on Inorganic and Theoretical Chemistry," Longmans, Green and Co., New York, 1929, pages 748, 825 and 826, vol. 9.